Dec. 4, 1962
D. W. HANSON
3,066,554
APPARATUS FOR CUTTING HOLES IN THIN FLEXIBLE WEBS
Filed June 25, 1958
2 Sheets-Sheet 2
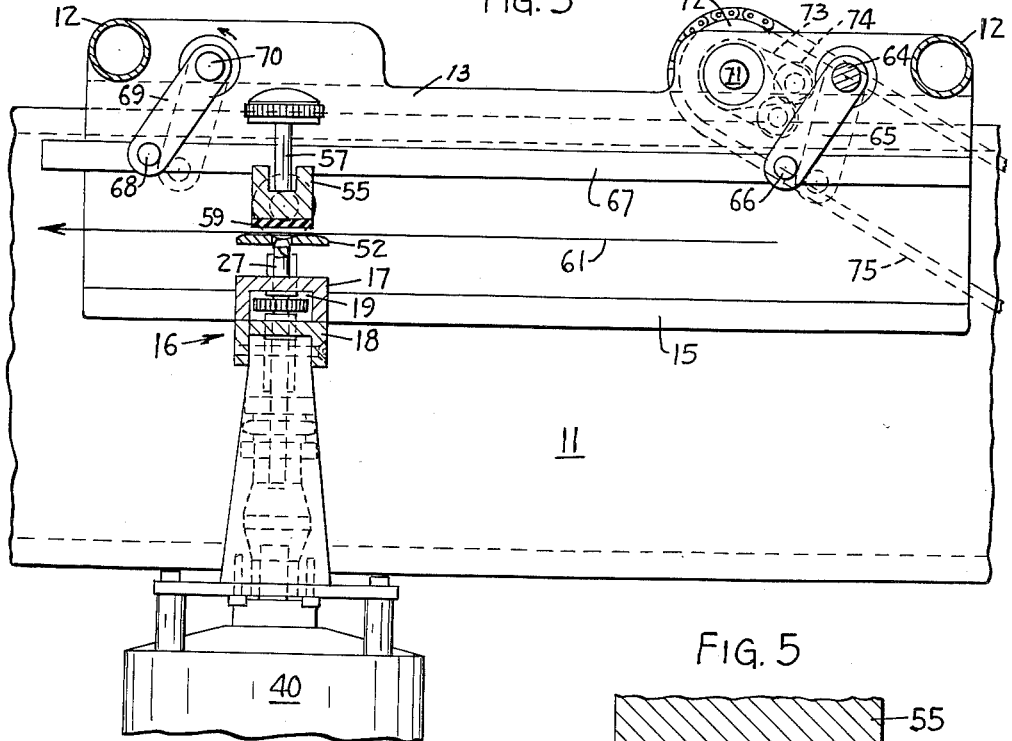
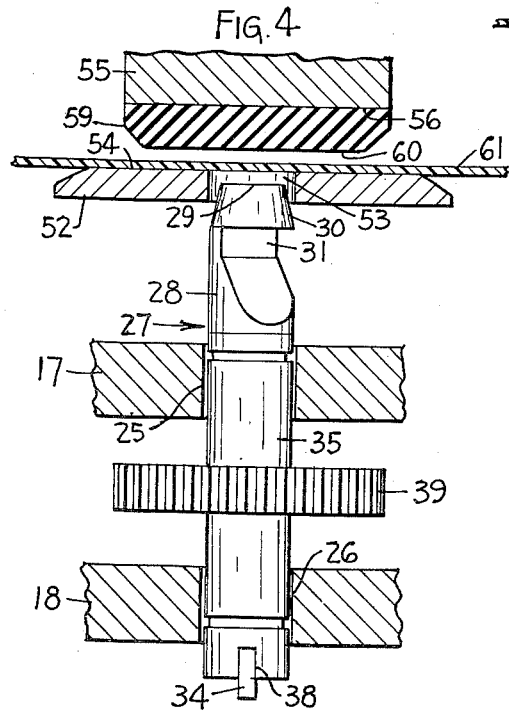
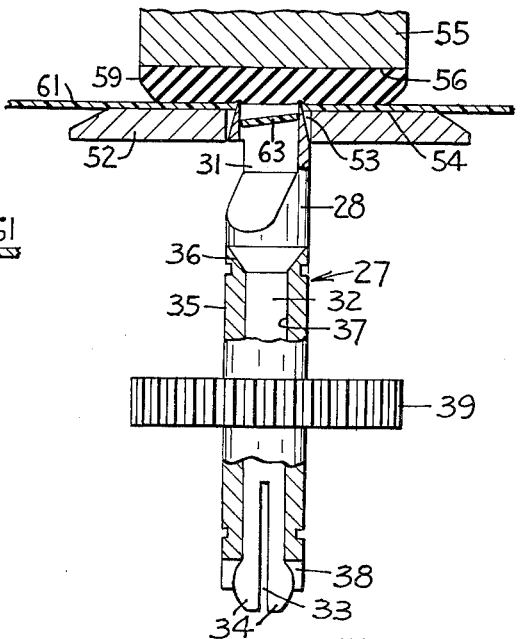
INVENTOR
DONALD W. HANSON
BY Frederick C. Meyers
ATTORNEY

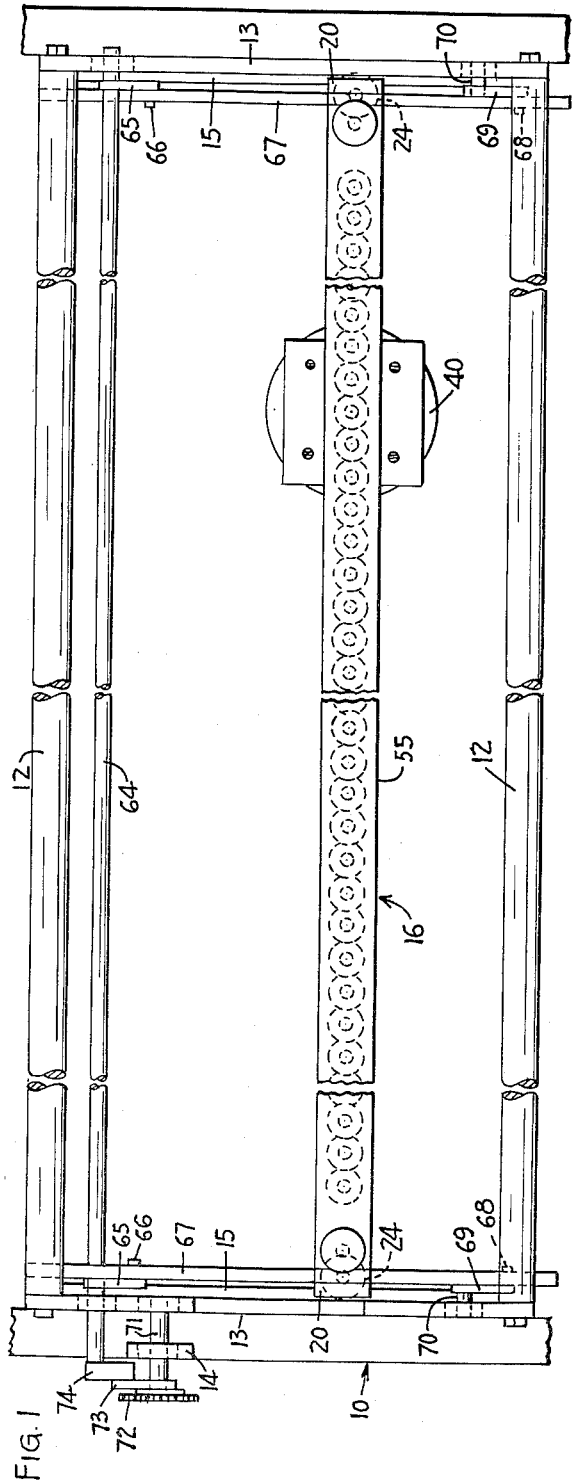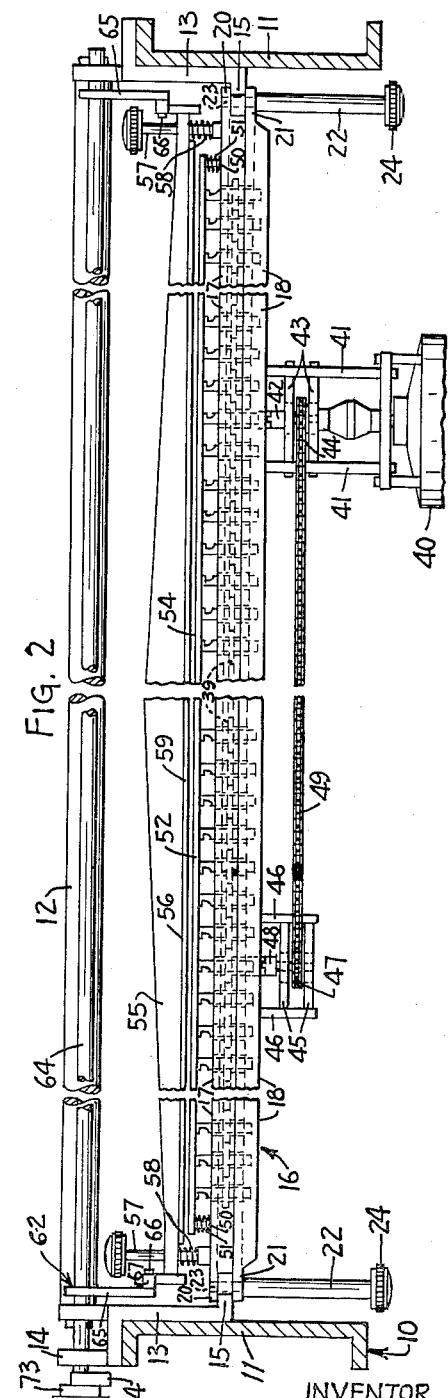

United States Patent Office 3,066,554
Patented Dec. 4, 1962

3,066,554
APPARATUS FOR CUTTING HOLES IN THIN FLEXIBLE WEBS
Donald W. Hanson, Northfield, Minn., assignor to G. T. Schjeldahl Company, Northfield, Minn., a corporation of Minnesota
Filed June 25, 1958, Ser. No. 744,399
1 Claim. (Cl. 77—22)

This invention relates to punching holes in sheet material, and more particularly to apparatus for cutting holes in thin plastic sheets.

It is desirable to have openings formed in the sides of certain types of plastic bags such as those designed to hold products which require ventilation. Since most plastic bags are constructed from rolled sheet material which is formed and cut consecutively as the material is unrolled, it is convenient to punch or cut holes therein just prior to making each bag. It is, therefore, a general object of the invention to provide an apparatus which will be quick and reliable in cutting holes in plastic sheeting so as to make possible intermittent action thereof in cutting holes in other sheeting using rolled material.

While ponderous punch and die equipment can be used for punching holes in thin plastic sheets, the cost and maintenance is high related to the fast and continuous operating requirements and the thin and light character of the sheet material to be punched. Further, the punched material will often accumulate and interfere with the continued operation.

Another object of the present invention is to utilize light-weight cutting equipment which eliminates the machined die and minimizes the importance of maintaining close tolerance in the mating of the punch with associated elements.

The present invention contemplates the use of rotary punch elements which are fast and require sharpening or replacing only at infrequent intervals. In previous attempts to use rotary punch and die assemblies, it was found that excellent results could be obtained with stiff sheets but when thin flexible webs were attempted to be so punched, the material would follow the punch and twist, particularly if the punch lost its initial sharp edge or became sticky.

It is a further object of the invention to provide a rotary punch which will make its own cooperating die and which will not twist thin plastic sheets or webs during operation and which, further, will automatically free itself from the sheets after each operation.

A further object of the invention is to provide a rotary punch which will cut small discs from plastic sheeting and, through its rotation, remove them to avoid accumulation and clogging of the apparatus.

A still further object is to provide an apparatus with a plurality of rotary punches, each having a tool head capable of removal and replacement simply by resilient and frictional means, yet which will be positively retained against slipping during rotation.

These and other objects and advantages of the invention will more fully appear from the following description, made in connection with the accompanying drawings, wherein like reference characters refer to the same parts throughout the several views and in which:

FIGURE 1 is a top plan view of my hole cutting apparatus, portions thereof being segmented for illustrative purposes and hidden portions being indicated by dotted line structure;

FIGURE 2 is a vertical section taken on the line 2—2 of FIGURE 1, and being similarly segmented;

FIGURE 3 is another vertical section taken on the line 3—3 of FIGURE 1, the alternate position of the means for convergently cutting the web being shown in dotted outline;

FIGURE 4 is an enlarged view of the cutting tool diagrammatically showing its relative position during travel of the web; and FIGURE 5 is an enlarged view similar to the of FIGURE 4, showing the tool partially in vertical section and in cutting position with respect to the web and cutting pad.

With continued reference to the drawing, my hole cutting apparatus is mounted on a frame 10 which is provided with side channel members 11 and transverse braces 12, as shown in FIGURES 1 and 2. Bearing bars 13 are secured on respective channel members 11 and upstanding flange portions 14, which lie in spaced parallel relation as shown. The lower portions of the bearing bars 13 extend in a horizontal flange 15 on each of the bearings and are convergently directed for holding the bearing structure 16. Bearing structure 16 comprises elongated upper portion 17 and lower portion 18 which define a hollow passageway 19 as shown particularly in FIGURE 3. The upper member 17 has a flanged portion 20 at each end and the lower member 18 has a similar flanged portion 21 at each end, the opposed faces of flanges 20 and 21 being adapted to slidably engage the horizontal bearing flange 15 for mounting purposes. A clamping bolt 22 has an upper end 23 adapted to threadably engage each pair of end flanges 20 and 21 to exert a clamping influence upon the upper and lower portions of the bearing structure. The clamping bolts 22 may be provided with suitable head 24 extending downwardly to facilitate rotation thereof.

Each of the upper and lower members 17 and 18 is provided with a plurality of bearing openings 25 and 26, respectively, the said bearing openings being vertically aligned for receiving respectively tubular rotatable cutting tools indicated generally at 27, details of which appear in FIGURES 4 and 5. The tubular rotatable cutting tools are provided with cutting heads 28, each terminating outwardly in a cutting edge 29. The cutting edge 29 is circular and beveled at the outer circumference so as to present a uniformly diametered tubular member 30. Below the tubular portion 30 is a passageway 31 which is cut or notched into the head 28 so as to lie in axial alignment with the tubular portion 30 and then smoothly curving downwardly and outwardly for radially ejecting cut discs which enter the tubular head portion 30 during operation. Below the head 28 is an axial shank 32, which is shown in FIGURE 5, and which extends downwardly and terminates in a bifurcated end 33 having abutment portions 34 in opposed relation, as shown in FIGURES 4 and 5. The abutment heads 34 are convergently yieldable so that they may be inserted into the hollow open-ended shaft 35, as shown in FIGURES 4 and 5. Hollow shaft 35 has a beveled upper end 36 and a tubular area 37 which terminates downwardly in the slotted end 38, as shown. The slotted end 38 is so diminished as to frictionally and resiliently receive the abutments 34 and to positively prevent slippage of the tool head 28 with respect to the shaft 35 during rotation thereof. Within the upper and lower bearing members 17 and 18 and rigidly secured to the hollow shaft 35 is a gear 39, as shown in all of the views. The gear 39 of each of the rotatable cutting tools is adapted to intermesh with a neighboring cutting tool along the elongated bearing structure 16 in such a manner that alternate cutting tools will rotate in the same direction. The direction of rotation is, however, of no consequence when considering any individual cutting tool. The circular cutting edge 29 of the respective cutting tools lie substantially in a plane which is parallel to the upper surface of bearing structure 16, as shown in FIGURE 2.

A depending motor 40 is mounted on a bracket 41 which, in turn, is secured to the bearing structure 16, as shown in FIGURES 2 and 3. Motor shaft 42 is coupled axially to one of the tubular rotatable cutting tools for directly driving the same. The motor shaft 42 is journaled across bearing members 43 and a sprocket wheel 44 is secured therebetween. Another pair of bearing members 45 lie in spaced relation remote from the bearings 43 and are secured to mounting bracket means 46 secured in depending relation to the bearing structure 16. A sprocket 47 is secured to shaft 48 which is rotatably received in the bearings 45 and is coupled directly to a rotatable cutting tool, as shown in FIGURE 2. A drive chain 49 connects the sprockets 44 and 47 and provides simultaneous rotation to remotely positioned cutting tools to assist in the rotation of all of the cutting tools and to alleviate the cumulative strain imposed upon the gear members 39 which are all intermeshed in series with the elongated bearing structure.

Adjacent each end of the bearing structure 16 is a rigid upstanding post 50 about which is secured in each instance a compression spring 51. An elongated stripper bar 52 is journaled on the post 50 in slidable relation therewith so that the bar 52 can be depressed resiliently downward toward the bearing structure 16. The stripper bar 52 has a plurality of openings 53, each loosely surrounding the tubular portion 30 of cutting head 28 in each of the rotatable cutting tools along the entire length of the bearing structure 16. Thus, whenever the stripper bar 52 is depressed, the circular cutting edges 29 of all the tools will project through and slightly above the upper surface 54 of the stripper bar 52, as shown diagrammatically in FIGURE 5.

An elongated mounting member 55 has a lower plane surface 56 which lies in spaced parallel relation with the bearing structure 16 and is slidably mounted at each end on posts 57 which, in turn, are vertically and rigidly secured to the upper portion 17 of bearing structure 16. A compression spring 58 surrounds the lower end of each of the posts 57 and exerts an upward biasing against the mounting member 55 so as to normally provide spaced clearance with the stripper bar 52.

Secured along the face 56 of the mounting member 55 is a resilient cutting pad 59 which, in turn, lies in confronting relation with all of the rotatable cutting tools so that the lower surface 60 thereof lies substantially normal to the axis of the circular cutting edge 29 and normally permits a web 61 to freely lie therebetween in contact with the upper surface 54 of stripper bar 52.

A mechanism 62 is provided to relatively move the cutting pad 59 with respect to the circular cutting edge 29 and thereby cut a circular disc 63 from the web 61 as shown in FIGURE 5. The mechanism 62 comprises a shaft 64 journaled across the upstanding flange portion 14 of each of the bars 13, as shown in FIGURES 1 and 2. A pair of pivot links 65 are secured adjacent each end of the shaft 64 in parallel relation and are pivoted at 66, each to a horizontal bar 67 which overlies the respective ends of the mounting member 55, as shown in FIGURE 3. In order to maintain the horizontal character of each of the bars 67, they are pivoted at 68 to a link 69 which lies parallel to each of the links 65 and are, in turn, pivoted respectively to stub shafts 70 which are secured to the bars 13 at an upper position corresponding to the shaft 64 to effect a parallel movement of the bars 67 whenever they are arcuately moved to the dotted line position shown in FIGURE 3. Also rotatably mounted on the bar 13 is a short shaft 71 to which is secured a sprocket 72 at its outermost end and a cam disc 73 at the opposite end. Cam disc 73 is provided with rolling contact element 74 which, under the influence of sprocket 72 during rotation by chain 75 will cause the pivot arm 65 and 69 to move alternately from the full line position to the dotted line position and thereby depress the bars 67 and the mounting member 55 in intermittent fashion.

The use and operation of my apparatus will be easily understood from the foregoing description. The web 61 advances rapidly in accordance with the requirements for distance between sets of openings to be drilled therethrough. After each advancing movement of the web 61, it momentarily comes to rest and the holes must be rapidly punched at this period prior to the next advancing movement of the web. While the web is at rest, the cam member 74 causes the bars 67 to depress the mounting member 55 together with its resilient pad 59 to first contact web 61 which lies against the stripper bar 52. As the cutting pad 59 is further depressed, the stripper bar 52 is likewise depressed against compression springs 51 until the circular cutting edges 29 come in contact with the web 61. The rotatable cutting tools are all in rotation and, hence, simultaneously cut discs 63 as the cutting pad 59 is further depressed The first time the cutting pad 59 is utilized, each of the cutting edges 29 will slice circularly into the pad 59 for a short distance, thus forming its own die for subsequent use. The cutting pad 59 is made of resilient material such as rubber or plastic composition having stiff and yieldable quality, yet being frictionally resistant at its surface to provide a non-skid contact with the web 61. The web 61 will thus be cleanly punched without twisting and the resilient pad 59 further tends to push the cut discs 63 into the tubular upper portion 30 of tool head 28 to free the cutting edge 29 for the next operation. Discs 63 do not accumulate but tend to be thrown outwardly at the lateral passageway 31 and are assisted by the centrifugal action imparted by rotation of each of the tools. When it is desired to utilize a different sized tool, the head 28 may be removed and a new one inserted into the hollow shaft 35, the abutments 34 maintaining frictional securement and preventing relative rotation between shaft 35 and the tool head 28; similarly, the tool heads 28 may be quickly removed and replaced for sharpening the tool edge 29. Since the cutting pads 59 are easily and cheaply replaced, the necessity for expensive mating dies has been eliminated. Further, the light construction permits rapid movement through a short distance to effect the rapid punching of holes desirable in the handling of thin plastic webs.

It will, of course, be understood that various changes may be made in the form, details, arrangements and proportions of the parts without departing from the scope of my invention as set forth in the appended claim.

What I claim is:

Apparatus for cutting holes in thin flexible webs which are fed intermittently, said apparatus comprising, a bar having a flat upper surface adapted to support a web during feeding thereof and being resiliently mounted for movement in a direction transversely of said surface, said bar being provided with a plurality of spaced openings extending therethrough and through said surface, a plurality of tubular cutting tools, one aligned axially with each of said openings, and having circular cutting edges normally lying in a fixed plane in spaced relation below said flat upper surface and said web when positioned thereon, means drivably connected to each of said cutting tools for rotating the same on its axis, a cutting pad having a resilient die surface adapted to be cut in shallow circular slits lying in spaced confronting relation with each of said circular cutting edges and with said flat upper surface of said bar, means for continuously reciprocating said cutting pad in timed relation to the dwell period of the intermittent web feed, said die surfaces in each reciprocating movement first advancing to clamp the web against said flat upper surface then to move simultaneously the die and upper bar surfaces with the web clamped therebetween toward and through the fixed plane of said circular cutting edges to cut a plurality of openings in the web, and finally retracting to move the clamped surfaces apart and to permit said bar to resiliently return to its normal position whereby to lift the entire web from all of said cutting tools prior to the next feeding movement of said web.

References Cited in the file of this patent

UNITED STATES PATENTS

| | | |
|---|---|---|
| 344,822 | Fiske | July 6, 1886 |
| 676,720 | Kollmyer | June 18, 1901 |
| 2,323,694 | Ward et al. | July 6, 1943 |
| 2,429,245 | Telles | Oct. 21, 1947 |
| 2,606,615 | Pevey et al. | Aug. 12, 1952 |
| 2,615,525 | Berner | Oct. 28, 1952 |
| 2,746,547 | Jenkins et al. | May 22, 1956 |